UNITED STATES PATENT OFFICE.

LUCIEN EILERTSEN, OF PARIS, FRANCE.

PROCESS FOR PREPARING AND COLORING PLASTIC SUBSTANCES USED AS BASES IN DENTAL PROSTHESIS.

987,451.     Specification of Letters Patent.     Patented Mar. 21, 1911.

No Drawing.     Application filed May 28, 1906. Serial No. 319,193.

*To all whom it may concern:*

Be it known that I, LUCIEN EILERTSEN, a citizen of the French Republic, and resident of 132 Boulevard Magenta, Paris, France, have invented a Process for Preparing and Coloring Plastic Substances Used as Bases in Dental Prosthesis, of which the following is a specification.

The use of the bases employed in dental prosthesis present some inconveniences and disadvantages. The plastic substances employed as bases are vulcanite and celluloid. The chief disadvantage is the black color of natural vulcanite which does not allow it to be used in that state for the visible part of the denture. Hence the almost exclusive employment of vulcanite colored red or rose to imitate the shade or color of the mucous surface. The red coloring matter hitherto employed is vermilion (sulfid of mercury). The rose tints are obtained by adding white coloring matter (oxid of zinc) to the vermilion.

The pure rubber has a density of 1.012 but that of dentures in colored vulcanite is much higher. This is easily understood. Besides a certain proportion of sulfur (density 1.97 to 2.2) red dental vulcanite contains as a rule 30% of vermilion of which the density is about 10. Rose vulcanite contains besides as much more oxid of zinc (density 5 to 6) as is desired to obtain a clearer shade, so that certain bases contain about 60% of mineral substance and this makes these articles heavy and brittle and makes it necessary for them to have, in order that they may be sufficiently solid, a thickness which increases their weight and is attended with inconvenience to the mouth as a whole and produces a want of distinctness in pronunciation. Again, rubber has no antiseptic properties and lends itself to a surprising extent to the development of the micro-organisms of the mouth on the particles of food which adhere to the surface of dentures which are not, as is most often the case, scrupulously and regularly cleaned.

Vermilion has no antiseptic property and some authors, including the inventor, have been able to prove that under the influence of fermentation small quantities of sulfid of mercury can be decomposed and converted into mercurial salts, the danger of which is well known. The symptoms arising from these microbic fermentations and from the decomposition of vermilion are known by the name of the "rubber disease" and have many times attracted the attention of medical men. Vermilion moreover is absolutely prohibited for coloring food products and the paper they are wrapped in, for coloring children's toys and especially india rubber dolls. The tolerance which vermilion enjoys in the manufacture of plates can only be explained by the inability up to the present to prepare vulcanite which shall satisfy esthetic conditions without the use of sulfid of mercury.

Dental celluloid apart from its vermilion coloring has none of the other disadvantages of rubber. It has a low density (1.35 to 1.40). It is very solid and easy to prepare. The camphor which forms a part of its composition acts as an antiseptic and stops the microbic fermentations of the mouth and no symptoms of the "rubber disease" are observed when plates are made of this material. There is accordingly need for a change in the present insanitary composition of the bases of dental prosthesis. Hence the following improvements which are the objects of this patent and which can be summed up as follows: for rubber, to obtain dentures as light as possible with the greatest amount of solidity and on the other hand to give them a shade of color which satisfies esthetic condition. But this should be obtained with coloring matter from which all harmful properties have been eliminated and which cannot acquire any during a long sojourn in the cavity of the mouth. For celluloid only the latter condition is necessary.

The manner of carrying out my invention is as follows:

White india rubber with zinc sulfid or oxid are dissolved in benzin. The coloring matter composed of four-fifths part of alizarin and one-fifth part of carmine is ground with a stamper or preferably with special grinding machines. This coloring matter being perfectly divided, it it mixed with the rubber solution and the mixture is triturated in a ball grinder or equivalent apparatus. The mass being intimately mixed, it is collected in large vessels and poured on plates for desiccating it. Subsequently, the material is passed through rolling machines which give it the desired thickness.

First. The lightness of rubber dentures is attained by preparing for the use of dentists not a homogeneous sheet of rubber colored throughout its mass, such as is found in the profession at present but a plate composed of two superimposed layers of soft rubber soldered together. The surface intended to form the visible part of the denture is thin and this alone is colored, the remainder being composed of the pure black rubber with the low density given above.

Second. Inoffensive coloring agents. These coloring agents should in the case of rubber satisfy the following conditions, viz., be insoluble in saliva and alimentary liquids without changing under the high temperature which vulcanite attains in the process of vulcanization and lastly give to vulcanite the shades required for dental use and possess no harmful property and not acquire any in the course of wear.

For rubber the use of carmine is claimed as a novel application for coloring dental vulcanite, preferably rendered insoluble by formol in order to obtain free carminic acid (this is the most preferable coloring matter) and of all the red coloring agents, insoluble in water, of the group of oxy-anthraquinones (alizarins) and their derivatives for red vulcanite. In order to obtain the rose tints, these coloring agents are whitened according to the shade required, either with a suitable proportion of oxid of zinc or, for certain shades with oxid of zinc or with sulfite of zinc and hyposulfite of soda, a product not as yet employed for this purpose. I also employ for certain gray shades in rubber and in coloring celluloid pure anhydrous oxid of iron (colcothar) previously washed in acid and in water until absolutely neutralized and preferably that colcothar which is obtained by calcining oxalate of iron, which is more tenuous. The very small proportions of coloring matter the shade whereof is enhanced by traces of carmine or the oxyanthraquinones and which is whitened with oxid of zinc or the said salts of zinc allow a whole range of rose tints to be produced in celluloid.

Having now fully described my said invention and what manner the same is to be performed, I declare that what I claim is:—

1. The hereindescribed process of coloring plastic substances used as bases in dental prosthesis which consists in chemically treating carmine whereby to render the same insoluble under the action of saliva and alimentary liquids, and then incorporating the treated carmine with the dental base so as to color the latter.

2. The hereindescribed process of coloring plastic substances used as bases in dental prosthesis which consists in acidifying and formalizing carmine to render the same insoluble under the action of saliva and alimentary liquids, and then incorporating the treated carmine with the dental base so as to color the latter.

3. The hereindescribed process of coloring plastic substances used as bases in dental prosthesis which consists in acidifying and formalizing carmine to render the same insoluble under the action of saliva and alimentary liquids, mixing a chemical substance such as described with the treated carmine to obtain gradations of color, and then incorporating the mixture with the dental base so as to color the latter.

In testimony whereof I have hereunto set my hand in presence of two witnesses.

LUCIEN EILERTSEN.

Witnesses:
 ADOLPHE STURM,
 AUGUSTUS E. INGRAM.

---

Copies of this patent may be obtained for five cents each, by addressing the "Commissioner of Patents, Washington, D. C."